Feb. 17, 1959   P. LEMAIGRE-VOREAUX   2,874,325
ELECTRODE FOR ELECTRIC DISCHARGE APPARATUS
Filed Feb. 3, 1953

INVENTOR
PIERRE LEMAIGRE-VOREAUX

BY Stone & Mack
ATTORNEYS

United States Patent Office 2,874,325
Patented Feb. 17, 1959

2,874,325

ELECTRODE FOR ELECTRIC DISCHARGE APPARATUS

Pierre Lemaigre-Voreaux, Paris, France, assignor to Societe Anonyme pour les Applications de l'Electricite et des Gaz Rares-Etablissements Claude-Paz & Silva, Paris, France Application February 3, 1953, Serial No. 334,835

Claims priority, application France February 5, 1952

1 Claim. (Cl. 313—355)

My invention relates to an electrode for an electric discharge apparatus, more particularly to an electrode comprising at least aluminum and one or more metals, the melting point of which is higher than that of aluminum.

One object of my invention is to provide an electrode for use in those kinds of lightning arrestors, which consist chiefly of two electrodes placed close to each other in a gas or vapor atmosphere, or in a gas and vapor atmosphere, under a low pressure, for instance of the order of one centimeter of mercury. The electrode of the invention may also be used in other kinds of discharge apparatus, particularly those which are subjected to large currents of a short duration, obtained, for instance, by discharging a condenser.

One feature of the present invention is to provide an electrode wherein aluminum is in the shape of at least one thin part or layer or assembly of several stacked up thin parts or layers at least one edge of each of which is arranged for contacting the space in which the discharge occurs, each one of the two faces of the parts or layers or of the assemblies of stacked up parts or layers being substantially entirely in contact with a wall constituted by a metal or metals having a higher melting point than aluminum, nickel for instance, the arrangement being such that if the aluminum is heated above its melting temperature, the aluminum is held between said walls by capillarity.

Such positioning of the aluminum part or layer makes it possible for the electrode to exceed (without being substantially modified thereby) the melting temperature of this metal, for instance when degassing the discharge apparatus using such an electrode, or after the apparatus has been put in operation, under the effect of an intense discharge, sufficiently long in duration. In effect, the thin part or the like, made of aluminum, being placed between two close walls which remain in a solid condition, is held by capillarity by said walls; the shape and position of the thin part are then little modified, if at all, and it remains in contact by one or more edges with the discharge space in the apparatus. A thin layer of aluminum, deposited on a metal part with a high melting point and in contact with the discharge space by its free face, could be damaged rapidly if it were subjected to intense discharges. A layer of aluminum, thick and having a free face would flow in case of melting and would only leave a very thin layer of the metal.

One advantage of aluminum and other metals with a low work-function, for constituting at least part of an electrode for a discharge apparatus, is to lower the cathode voltage drop of that apparatus. For an electrode of a lightning arrestor, this advantage, other things being equal, shows up in a lesser heating of this electrode and, consequently, of the lead-in wire for this electrode, which is generally the most delicate portion of the apparatus; further, the use of a low work function metal shortens the delay which elapse between the time when a voltage is applied to the lightning arrestor and that when the discharge starts between the electrodes. This last advantage is particularly valuable when the lightning arrestor is meant to be subjected to shock waves, i. e. to voltages which increase very rapidly as a function of time.

Among the low work-function metals, aluminum is especially advantageous because its price is low and it is easy to shape; besides, the thin alumina film which coats it shields it against chemical attacks under the conditions prevailing during the manufacture of discharge devices; moreover this film promotes the formation of an arc discharge in some cases.

In drawings, which illustrate embodiments of the invention,

Figure 1:
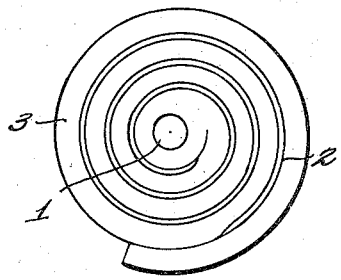
Figure 1 shows an electrode seen from above.

The electrode shown in Figure 1 comprises an aluminum strip 2 and a nickel strip 3, wound in a spiral around a lead-in wire 1, of tungsten, for example. The wire 1 is welded to the inner nickel turn. The aluminum strip is shorter than the nickel strip so as to allow the welding of the last turn of nickel, i. e., the outer one, on the last but one turn of this metal thereby to prevent the unwinding of the two spirals.

One may, for instance, around a lead-in wire 1, with a 1 mm. diameter, wind a nickel strip 3, which is 3 mm. wide and 0.5 mm. thick and a strip 2 of aluminum, of the same width and 0.1 mm. thick, the nickel strip extending over 5 turns approximately and the aluminum strip over about 3 turns.

Such an electrode has a high heat capacity, in spite of its small volume. Further, the heat evolved in this electrode when a lightning arrestor using this electrode is subjected to an electric discharge, is relatively low, because the cathode drop on aluminum is small, and because the ohmic voltage drops are low, since the contact between the aluminum strip and the nickel strip is effected over a large area, and that between the nickel strip and the lead-in wire 1 is ensured by welding over a fairly large area.

If, under the action of a discharge, the electrode should happen to exceed the melting temperature for aluminum, this metal is held by capillarity and remains in the electrode and at its surface, except for that which is pulverized by the discharge bombardment.

Figure 2:
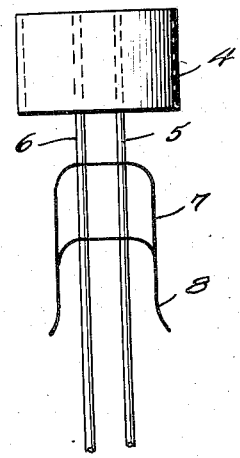
Figure 2 shows, in elevation, a modification of the electrode of Figure 1.

Figure 2 shows, in elevation, a somewhat similar electrode, its two lead-in wires 5 and 6, and a portion of the stem 8 carrying this electrode. The use of the two lead-in wires provides a more rigid support for the electrode than does one wire; in addition, such use makes it possible to pass through the lightning arrestor heavier currents than when using only one lead-in, of the same diameter. Furthermore, the use of two lead-in wires, gives rise to lower stresses inside the pinched portion 7 of the stem 8, than if using a single lead-in wire of twice the cross section of one of the double lead-in wires.

The nickel and aluminum strips are wound in a spiral flattened about the two current lead-in wires, these being welded to the nickel strip. The whole is held in a nickel sleeve 4 which presses the turns against one another.

Figure 3:
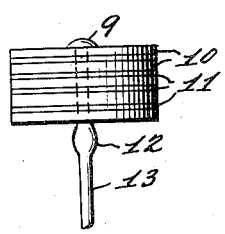
Figure 3 shows, in elevation, another electrode.

The electrode of Figure 3 is formed mainly by a stack up of washers, alternately of iron (10) and aluminum (11). These washers are forced on a molybdenum lead-in wire 13; the securing of the washers on the lead-in wire 13 is ensured, for instance, by peening the end 9 of the lead-in wire into a pin head, and pinching the portion 12 of this wire, which portion is just under the stack of washers 10 and 11.

The electrode may consist, for instance, of 5 iron discs 10, 0.3 mm. thick and 6 mm. in diameter, and 4 aluminum discs 11, 0.05 mm. thick and 6 mm. in diameter, placed on a molybdenum rod 13, 1.5 mm. in diameter.

Each of the aluminum discs 11 may be replaced by a thick aluminum coating of the iron discs 10.

Figure 4:
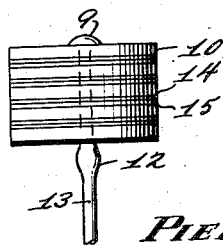
Figure 4 shows, in elevation, still another electrode.

The electrode of Figure 4 differs from that of Figure 3 in that each aluminum member is formed by two stacked-up thin parts such as 14, 15, these parts being, for instance, aluminum coatings on the iron discs 10 or aluminum discs.

In the above described electrodes, aluminum may be pure metal or an alloy comprising mainly this metal. Nickel or iron may be replaced by another metal which has a relatively high melting point, and which is preferably easy to rid of gases.

Other modifications within the scope of the invention may be made in the electrodes described. The aluminum strip may, for instance, be replaced by a deposit obtained by gun spraying or electroplating onto the less easily melted metal, a deposit which should be sufficiently thick to still have some of this metal remaining on the surface of the electrode in spite of the pulverizings due to the number of discharges.

In view of the foregoing, it is apparent that my invention provides an electrode particularly suitable for use in electric discharge tubes designed to work at heavy loads of short duration and in which the starting delay of the discharge must be very short.

What I claim is:

An electrode for an electric discharge apparatus, comprising at least two strips of different metals, the lower melting metal being aluminum and being in the form of a thin strip and at least one current lead wire, said strips being wound together about said wire, and the winding being sufficiently close for the aluminum strip to be substantially entirely in contact with the other strip.

References Cited in the file of this patent

UNITED STATES PATENTS

| | | |
|---|---|---|
| 889,937 | Little | June 9, 1908 |
| 1,852,020 | Metcalf | Apr. 5, 1932 |
| 1,949,383 | Weber | Feb. 27, 1934 |
| 2,477,279 | Anderson | July 26, 1949 |
| 2,697,130 | Korbelak | Dec. 14, 1954 |